Aug. 5, 1930.  H. R. WALLACE  1,772,196
AIRCRAFT
Filed April 30, 1928    2 Sheets-Sheet 1
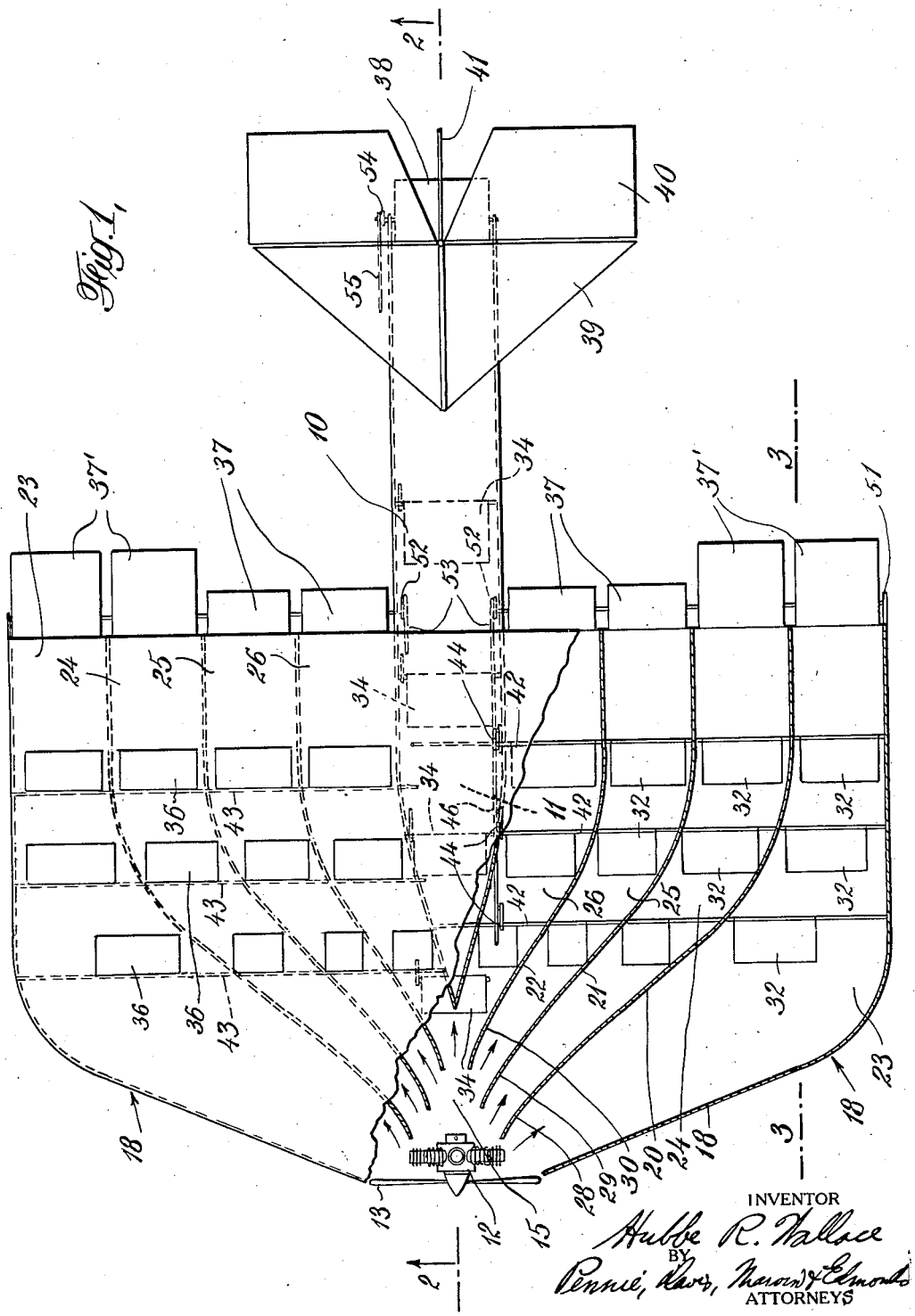

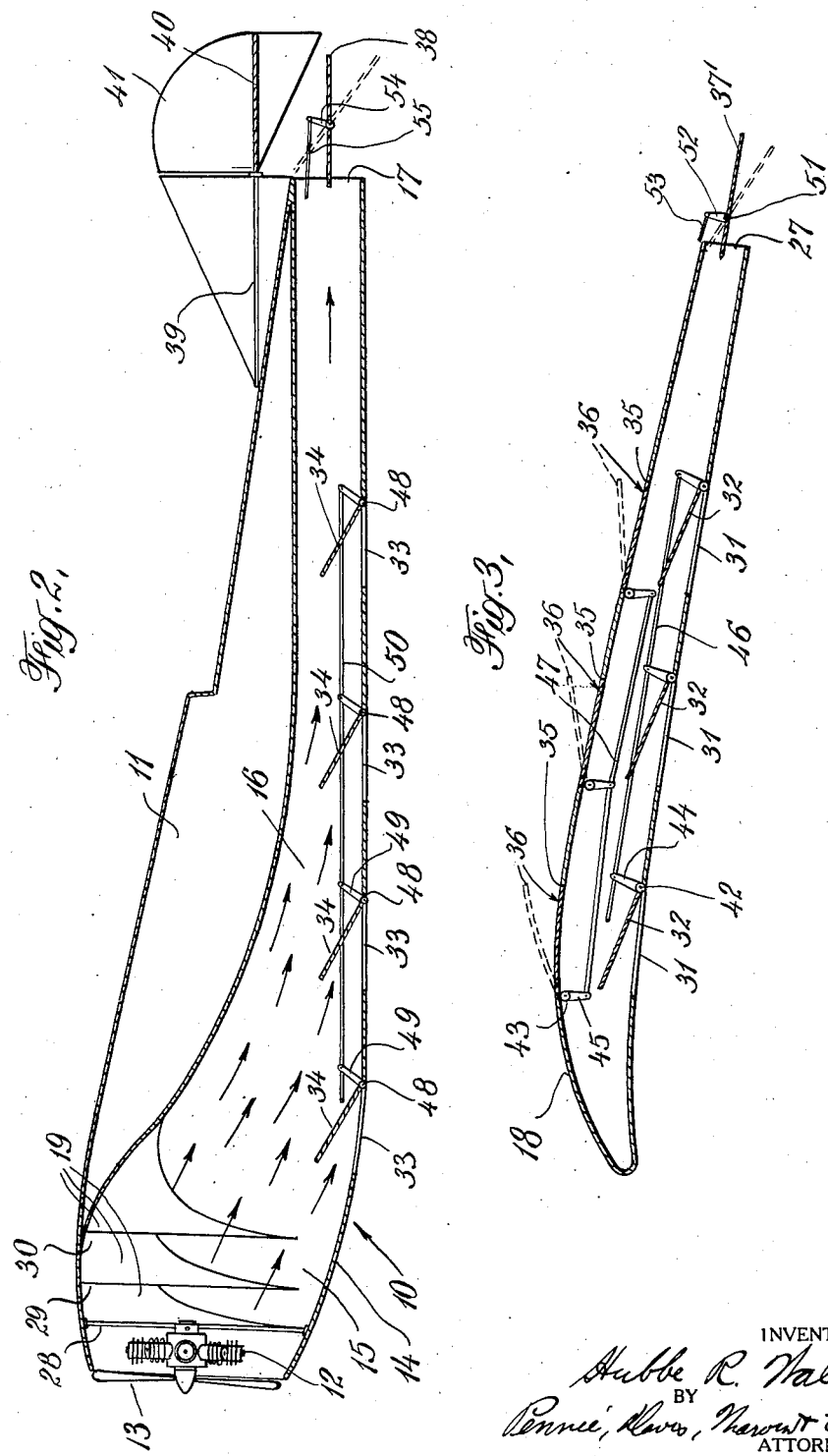

Patented Aug. 5, 1930

1,772,196

UNITED STATES PATENT OFFICE

HUBBE R. WALLACE, OF PARK CITY, UTAH

AIRCRAFT

Application filed April 30, 1928. Serial No. 273,839.

This invention relates to aircraft and has particular reference to heavier-than-air craft of the aeroplane type in which a body having plane surfaces arranged at an angle to the proposed direction of travel is maintained in and driven through the air by an aerial screw propeller driven by a suitable motor, the air pressure developed by the forward movement on the underside of the planes serving to raise and maintain the body in the air while the traction produced by the propeller drives the body in a forward direction. In aeroplanes constructed heretofore, the air displaced by the aerial screw propeller is dispersed while the pressure on the planes for lifting and maintaining the machine in the air is obtained by the velocity of the machine through the air. Thus the propeller displaces the air to drive the machine forwardly, but the air displaced by the propeller in the form of a high pressure air stream is largely lost by dispersion as the machine advances. This is especially true in the case of the pusher type of aeroplane where the propellers are mounted in the rear of the main planes, while in the tractor or forward propeller type of aeroplane the pressure produced by the propeller is not desirable and is frequently dispersed by stream line construction. It is well known that the air stream produced by a screw propeller takes the form of a cylindrical jet of great velocity, this velocity being greatest at the tips of the propeller blades and least at the axis of rotation thereof.

It is the principal object of this invention to provide aircraft which immediately utilizes the air stream produced by the propeller instead of allowing it to disperse and which utilizes this air stream without diminishing the tractive effect of the propeller in displacing air to advance the craft. The propeller air stream is used immediately as produced upon suitable planes to elevate the machine without the necessity of driving the machine along the ground until sufficient speed is obtained to produce sufficient elevating pressure upon the under side of the planes to raise the machine. By immediately utilizing the propeller air stream as produced, the aeroplane may take off within a few lengths and from a field of small area, as the lifting action of the propeller air stream on the planes takes place immediately. During flight, the propeller air stream, impinging upon suitable planes, may be controlled at will by altering the pitch of these planes to produce various aerodynamic effects.

In accordance with this object, the invention conisists of an aeroplane constructed in such a way that the air stream produced by the propeller is confined in order that it may be readily controlled. This confinement of the air stream is obtained by making the main planes and fuselage of the aeroplane hollow to form wind tunnels, the air stream being distributed to these air tunnels in accordance with the velocity thereof, that is, the air of greatest velocity is distributed to the tunnels remote from the propeller while the air of less velocity is distributed in tunnels near the propeller, the greatest air velocity being produced by the tips of the propeller plates as aforesaid. The air tunnels are each provided with a plurality of plane vanes hinged to the upper and lower surfaces of the main planes in which the principal air tunnels are formed.

The vanes in the lower surfaces of the main planes are arranged so that they may be elevated to lie in the air stream of their respective wind tunnels and simultaneously to open apertures in the lower surface of the main planes so that the vanes deflect air downwardly through these apertures whereby the resultant reaction produces a lifting effect. The upper surfaces of the main planes are provided with similar vanes which may also be elevated to open apertures through which the air of the wind tunnels flows, these upper vanes being adapted to be actuated during flight so as to partially neutralize the lifting effect of the lower vanes. A similar wind tunnel is formed by the lower portion of the fuselage, the lower surface of which is also provided with lifting vanes similar to those provided on the lower surfaces of the main planes. The rear edges of the main planes forming the wind tunnels are also provided with apertures through which the excess air stream may flow, these apertures being provided with stabilizing planes or ailerons of the usual type for warping the main planes, these ailerons, however, also acting with the upper and lower vanes to produce the effect described. The wind tunnel formed in the fuselage is also provided with a similar stabilizing vane for the same purpose. The aeroplane is generally shaped in the usual way, the main planes having the standard cambered aerofoil cross-section, and are placed at an angle with respect to the direction of flight in order that the air pressure on the under surfaces of the main planes will maintain the aeroplane in flight in the usual way. It will be seen that in order to confine the propeller air stream in the wind tunnels, a tractor machine is preferred, the propeller being placed at the front end of the fuselage and being confined by the walls of a distributing wind tunnel to which the main plane and fuselage wind tunnels are connected.

For a better understanding of the invention, reference is made to the accompanying drawings, in which Figure 1 is a semi-diagrammatic plan view of an aeroplane constructed in accordance with this invention;

Fig. 2 is a longitudinal section taken along the line 2—2 of Fig. 1; and

Fig. 3 is a cross-section of one of the wings taken along line 3—3 of Fig. 1.

In these drawings, numeral 10 generally designates the fuselage containing the cockpit 11 which is preferably stream-line shaped in order to diminish frictional resistance and contains the operator's and passenger's seats as well as the various necessary apparatus such as fuel tanks, equipment, and the like. The fuselage frame extends forwardly of the cock-pit 11 and mounts the engine or motor 12, which is preferably of the air-cooled type, and the propeller 13 connected to and driven by the motor 12. The covering 14 of the fuselage 10 surrounds the propeller 13 in the manner illustrated, so that a closed chamber 15 is formed between the propeller 13 and the cock-pit 11. This chamber is extended beneath the cock-pit 11 as an elongated passage 16 extending to the tail of the aeroplane and provided with an open end 17.

Extending laterally of the fuselage 10 in the usual way, are the wings or main planes 18, which are preferably of the swept-back type, and having the standard cambered aero-foil cross-section illustrated by Fig. 3. These wings are hollow and communicate with chamber 15 through apertures 19 as shown in Fig. 2. Stream line partitions 20, 21 and 22 divide each of the hollow wings into wind tunnels 23, 24, 25, and 26, each of these wind tunnels being provided with an open rear end 27, as shown in Fig. 3. In order that the cylindrical air stream produced by the propeller 13 may be divided in accordance with the decreasing velocity of the stream from the tips of the propeller blades to the hub thereof, each of the partitions 20, 21 and 22 is provided with a suitable deflector in air chamber 15. As wind tunnels 23 are most remote from air chamber 15, it is preferable that the air of greatest velocity be distributed thereto, and the air of lower velocity be distributed to tunnels nearest the propeller in order that the air flowing into each tunnel may be of approximately the same velocity. Accordingly, deflectors 28 of partitions 20 are placed toward the tips of the propeller blades within air chamber 15 in order that the highest velocity air which is produced at the tips of the propeller blades may be introduced into remote wind tunnels 23. In the same way, deflectors 29 of partitions 21 distribute air of next highest velocity into wind tunnels 24, deflectors 30 distribute air of the next highest velocity into wind tunnels 25, while deflectors 30 of partitions 22, which cooperate with the stream line shape of cock-pit 11 to form tunnels 26, distribute low velocity air from the center of the air stream to tunnels 23. Similarly, the stream line lower surface of cock-pit 11 distributes air to the fuselage passage 16.

The lower surfaces of the wings 18 at each of the air tunnels are provided with apertures or openings 31 spaced longitudinally of the respective tunnels. Each of these openings 31 is normally covered by a plane vane 32, which is preferably hinged to the rear edge of the corresponding opening 31 in the manner illustrated particularly in Fig. 3. The lower surface of the fuselage 10 is also provided with apertures 33 which are similarly fitted with plane vanes 34 hinged at the rear edges of these apertures. The upper surfaces of the wings 18 are also provided with openings 35 spaced longitudinally of the several wind tunnels and which are normally closed by plane vanes 36, hinged to the forward edges of these openings so that the vanes may be elevated upwardly at an angle to uncover these openings 35. It is preferred that openings 35 be placed directly above openings 31 in the lower surface of the wings.

Within the open rear edges 27 of the wings 18 are provided plane vanes 37, which are mounted for pivoting movement about a transverse axis so that they present their surfaces at an angle to the air stream. The lateral pair of these vanes 37' in each side are extended rearwardly to form the ailerons for warping the machine in flight in order to secure stability in the usual way. Thus the vanes 37 and 37' have two functions. A similar vane 38 is mounted in the rear opening 17 of fuselage passage 16, this vane being also mounted for pivoting movement about a transverse axis so as to present an angular surface to the air stream. The tail of the aeroplane is provided with the usual equipment, such as the empennage 39 for longitudinal stability, the elevators 40, and the rudder 41.

Various forms of control means to be operated from the cock-pit 11 may be provided for actuating vanes 32, 36, 37, and 38. Such means may be of the ordinary double cable and lever combination, electrical solenoids or gears. One of these, namely levers, is shown for purposes of illustration. Inasmuch as each set of vanes 32 and 36 is preferably controlled as a unit, each row of each set may be fitted with a shaft 42 and 43, respectively, mounted on the wings 18 by suitable means. Connected to each shaft 42 and 43 are levers 44 and 45, respectively, which are connected together by links 46 and 47, respectively, these links being oscillated longitudinally from the cockpit 11 by the operator to open and close the vanes at will by suitable actuating mechanism not shown. In the same way vanes 34 in the fuselage lower surface may be mounted upon shafts 48 which are operatively connected to shafts 43 so as to be operated simultaneously therewith, or the shafts 48 may be provided with separate levers 49 operated by link 50 as shown in Fig. 2. Likewise, vanes and ailerons 37 and 37' may be mounted on a rotatable shaft 51 which carries a lever 52 and actuating link 53, but as the ailerons of either wing 18 are moved in opposite directions to produce the warping action, shaft 51 and the actuating mechanism should be divided, one for each wing 18, so that the variable action can be obtained when required. Vane 38 at the tail of the aeroplane is also provided with a lever 54 connected to link 55 which is actuated from the cock-pit by suitable means not shown to tilt this vane in opening 17.

In operation, the motor 12 of the aeroplane is started while the machine is at rest but ready for flight, and immediately the air displaced by the propeller 13 is blown at high velocity into air chamber 15. As the air stream thus produced is cylindrical in shape, and as the velocity of the air is greatest at the tips of the propeller blades and decreases in velocity toward the hub of the propeller, it is desirable to distribute this air stream in accordance with the velocity of portions thereof. Accordingly, the air of highest velocity, i. e. that at the propeller tips, is separated by deflectors 28 and led into remote wind tunnels 23 in wings 18, while deflectors 29 and 30 lead the air of decreasing velocity into tunnels 24, 25 and 26, respectively, and the stream-line lower surface of the cock-pit 11 distributes a portion of the air stream into fuselage tunnel 16.

When the aeroplane is at rest and in readiness for flight, the vanes 36 in the upper wing surfaces are all closed, lower vanes 32 and 34 are raised at an angle to uncover the corresponding apertures 31 and 35, respectively, while vanes 37, 37' and 38 are tilted so that their forward edges are raised to substantially close the upper portions of passages 27 and 17, respectively, as shown in Figs. 2 and 3. The motor 12 is then started and the high velocity air blast developed by the propeller 13 is distributed to the various wind tunnels in the manner illustrated by the arrows in the drawings. While the direct thrust of the propeller 13 moves the aeroplane forwardly, the air displaced thereby in so doing is not lost but is confined in the air tunnels where it impinges against the inclined surfaces of vanes 32, 34, 37, 37', and 38, causing the air to be deflected downwardly through the corresponding openings, whereby an upward reaction takes place which raises the aeroplane as a whole so that it moves upward and forward. Inasmuch as the air blast immediately impinges upon these inclined vanes when the motor is started, the aeroplane begins to rise at once so that it is unnecessary to develop sufficient ground speed to take off but the aeroplane will rise without appreciable movement along the ground, whereby it is possible to take off from a field of small area.

After the craft has attained sufficient elevation to allow rapid forward movement, upper vanes 36 are raised to uncover apertures 35, and vanes 37, 37' and 38 are returned to the normal position in alignment with the wings 18 and tail 40, respectively, as is illustrated in Figs. 2 and 3. The air stream divides between openings 31 and 35 whereby the lifting effect of vanes 32 is partially neutralized, while the remainder of the air stream flows through rear openings 17 and 27, the resultant effect being direct movement forward.

Inasmuch as these vanes lie in the air streams, i. e., the interior stream developed by the propeller in the manner described and the exterior stream developed by the movement of the craft in flight, the adjustment of these planes in various positions produces various aerodynamic effects which may be more rapidly procured in the machine of this invention. For example in climbing to higher levels, the lower vanes 32 and 34 may remain elevated, the upper vanes closed, and the rear vanes 17 and 38 turned so that their forward edges are down. This has the effect of raising the nose of the craft and depressing the tail thereof while operating the tail planes 40 in the usual way. Also in securing stability by operating the ailerons 37′ in opposite directions, the air blast impinging thereon from opening 37 in addition to the exterior air stream flowing over the wing surfaces, which impinges upon the tops of the elongated vanes 37′ which extend beyond the surfaces of the wings, while the shorter vanes 37 which do not extend beyond the wing surfaces are influenced only by the propeller air stream issuing from opening 27. The joint effect thus produced secures more rapid stabilizing action of the ailerons 37′, augmented by the action of the air stream acting upon vanes 37 and that portion of vanes 37′ which lies within opening 37 and therefore under the influence of the air stream issuing therefrom. Various other obvious aerodynamic effects may be procured by actuating the propeller air stream in vanes in various ways, but it is understood that the craft embodies the general construction of the usual aeroplane and acts in the same way while flying.

While the invention has been described as applied to heavier-than-air craft of the aeroplane type, it is apparent that the same principles may be applied to lighter-than-air craft which embody a driving force such as a propeller. For example, the motor gondolas of a dirigible airship may be formed or provided with air tunnels and vanes to produce the various aerodynamic effects described. Furthermore, it is to be understood that the invention is not limited to the particular construction illustrated and described, but that it is susceptible to many alterations and modifications such as the use of different forms of impellers or aerial screws, a different form of wind tunnel and arrangement of vanes, and the like. For example, in some types of craft, especially in the smaller designs, it may be desirable to dispense with the partitions which form a number of wind tunnels and use the entire interior portion of the wings or the like as a single wind tunnel embodying the general principles described.

I claim:

1. In aircraft, the combination of an aerial propeller, a motor therefor, a hollow body at least partially enclosing the propeller for receiving only the air stream produced thereby, hollow wings communicating with the interior of said hollow body, openings in the body and wings, movable vanes normally closing said openings in the body and wings, said vanes when opened being arranged to be acted upon by the said air stream passing through said openings, and means for controlling said vanes.

2. In aircraft, the combination of an aerial propeller, a motor therefor, a hollow body at least partially enclosing the propeller for receiving only the air stream produced thereby, hollow wings communicating with the interior of said hollow body, openings in the body and wings, movable vanes normally closing said openings in the body and wings, said vanes when opened being arranged to be placed in the air stream for deflecting a portion of said stream through the corresponding openings, and means for controlling said vanes.

3. In aircraft, the combination of an aerial propeller, a motor therefor, a hollow body at least partially enclosing the propeller for receiving only the air stream produced thereby, hollow wings communicating with the interior of said hollow body, openings in the body and wings, movable vanes mounted over said openings in the body and wings, pivotal mountings for said vanes, and means for pivoting said vanes to introduce them into the air stream, whereby a portion of the stream is deflected through the openings.

4. In aircraft, the combination of a body having lateral wings, a propeller mounted thereon, a motor for driving the propeller, a wind tunnel in the body and wings communicating with the propeller for receiving only the air stream produced thereby, openings in the wind tunnel, movable vanes mounted over said openings for controlling the air passing through said openings, and means for controlling said vanes.

5. In aircraft, the combination of a body having lateral wings, a propeller mounted thereon, a motor for driving the propeller, a wind tunnel in the body and wings communicating with the propeller for receiving only the air stream produced thereby, a series of openings in the lower wall of the tunnel, vanes normally closing said openings, and means for moving said vanes in the same direction into the air stream at an angle to uncover said openings and deflect a portion of the air stream through the corresponding openings.

6. In aircraft, the combination of a body having lateral wings, a propeller mounted thereon, a motor for driving the propeller, a wind tunnel in the body and wings communicating with the propeller for receiving only the air stream produced thereby, openings in the upper wall of the tunnel, vanes normally closing said openings, and means for moving said vanes at an angle into the air stream to uncover said openings and deflect a portion of the air stream through the corresponding openings.

7. In aircraft, the combination of a body having lateral wings, a propeller mounted thereon, a motor for driving the propeller, a wind tunnel in the body and wings communicating with the propeller for receiving only the air stream produced thereby, openings in the upper and lower walls of the tunnel, vanes normally closing said openings, and means for moving said vanes at an angle into the air stream to uncover said openings and deflect a portion of the air stream through the corresponding openings.

8. In aircraft, the combination of a body having lateral wings, a propeller mounted thereon, a motor for driving the propeller, a main wind tunnel in the body and communicating with the propeller for receiving only the air stream produced thereby, branch tunnels in said wings communicating with the main wind tunnel, an opening in the end of the main tunnel for passage of the air stream, a vane mounted in said opening and normally lying parallel to the air stream, and means for moving said vane at an angle to the air stream to deflect the same.

9. In aircraft, the combination of a body having laterally extending wings, a propeller mounted thereon, a motor for driving the propeller, a main wind tunnel in the body and communicating with the propeller for receiving only the air stream produced thereby, branch tunnels in said wings communicating with said main tunnel, openings in the walls and ends of the tunnels, vanes in these openings, the vanes in the walls normally closing the corresponding openings, and means for moving said vanes at an angle in the air stream to deflect the same through the openings.

10. In aircraft, the combination of a body, having laterally extending wings, a propeller mounted thereon, a motor for driving the propeller, a main wind tunnel in the body and communicating with the propeller for receiving only the air stream produced thereby, branch tunnels in said wings communicating with the interior of said main tunnel, openings in the walls of the tunnels, vanes normally closing said openings, an opening in the end of the main tunnel for the free passage of the air stream, a vane in this end opening normally arranged parallel to the air stream, and means for moving said vanes at an angle in the air stream, whereby the air stream exerts pressure on the vanes.

11. In an aeroplane, the combination of hollow wings, a propeller, a communication between the propeller and the interior of the wings for conducting only the propeller air stream therein, openings in the surfaces of the wings, substantially horizontal vanes normally closing said openings, and means for moving said vanes at an angle into the air stream to deflect the air through the corresponding openings and exert pressure upon the vanes.

12. In an aeroplane, the combination of hollow wings, a propeller, a communication between the propeller and the interior of the wings for conducting the propeller air stream therein, openings in the surfaces of the wings, vanes normally closing said openings, an opening in the rear edge of the wings, a vane in said opening and normally lying parallel to the air stream, and means for moving said vanes at an angle to the air stream whereby the air exerts pressure on said vanes.

13. In an aeroplane, the combination of hollow wings, a propeller, a communication between the propeller and the interior of the wings for conducting the propeller air stream therein, openings in the lower surfaces of the wings, pivotal vanes normally closing said openings, means for moving said vanes at an angle into the air stream whereby the air exerts upward pressure on the vanes and is deflected through the corresponding openings, an opening in the rear edge of the wings for the normal passage of the propeller air stream, ailerons mounted in said opening normally parallel to the air stream, and means for moving the ailerons at an angle whereby the air stream exerts pressure thereon.

14. In an aeroplane, the combination of hollow wings, a propeller and motor therefor, partitions in the wings forming air tunnels, deflectors in the propeller air stream for leading a portion of the air into each of said tunnels, substantially horizontal vanes adjacent the several tunnels arranged to be acted upon by the air streams therein, and means for moving said vanes at an angle, whereby the corresponding air streams exert pressure thereon.

15. In an aeroplane, the combination of hollow wings, a propeller and motor therefor, partitions in the wings forming air tunnels, deflectors in the propeller air stream for leading a portion of the air into each of said tunnels, said deflectors being arranged to distribute the high velocity air of the stream to the remote tunnels and the low velocity stream to the near tunnels, vanes adjacent the several tunnels arranged to be acted upon by the air stream therein, and means for moving said vanes at an angle, whereby the corresponding air streams exert pressure thereon.

16. In an aeroplane, the combination of wings and a fuselage, rearwardly directed air tunnels in the wings and fuselage, means for leading only the air stream produced by the propeller into the several tunnels, and substantially horizontal vanes arranged in these tunnels for deflecting the air to produce reaction pressures in a forward and upward direction.

17. In an aeroplane, the combination of wings and a fuselage, rearwardly directed air tunnels in the wings and fuselage, means for leading only the air stream produced by the propeller into the several tunnels, substantially horizontal vanes mounted for impingement by the tunnel air streams, and means for moving said vanes at an angle to the air stream to produce various aerodynamic effects.

18. In an aeroplane, the combination of wings and a fuselage, rearwardly directed air tunnels in the wings and fuselage, means for leading only the air stream produced by the propeller into the several tunnels, openings in the rear and sides of these tunnels, substantially horizontal vanes arranged adjacent these openings for impingement of the air streams, and means for moving said vanes at an angle whereby the air streams exert variable pressure on these vanes.

In testimony whereof I affix my signature.

HUBBE R. WALLACE.